US006464430B1

(12) United States Patent
Maleck

(10) Patent No.: US 6,464,430 B1
(45) Date of Patent: Oct. 15, 2002

(54) SOIL DECONTAMINATION APPARATUS AND METHOD

(76) Inventor: Tom L. Maleck, 362 Water St., Ellsworth, ME (US) 04605-2108

( * ) Notice: Subject to any disclaimer, the term of this patent is extended or adjusted under 35 U.S.C. 154(b) by 0 days.

(21) Appl. No.: 09/427,606

(22) Filed: Oct. 27, 1999

(51) Int. Cl.[7] ................................................. B09C 1/06
(52) U.S. Cl. .......................... 405/128.6; 405/128.85; 405/128.15; 110/241; 110/346; 432/146
(58) Field of Search ........................... 405/128.1, 131, 405/128.15, 128.6, 128.85, 128.45, 128.7; 588/19, 213, 216, 220; 432/121, 134, 146; 110/235, 236, 346, 241

(56) References Cited

U.S. PATENT DOCUMENTS

| | | | | |
|---|---|---|---|---|
| 4,576,572 A | * | 3/1986 | Mueller et al. ............. | 432/134 |
| 4,748,921 A | * | 6/1988 | Mendenhall ................ | 110/346 |
| 4,974,528 A | * | 12/1990 | Barcell ....................... | 110/236 |
| 5,020,452 A | * | 6/1991 | Rybak ........................ | 110/236 |
| 5,020,858 A | * | 6/1991 | Crosby et al. .............. | 405/128 |
| 5,085,581 A | * | 2/1992 | Mendenhall ................ | 110/246 |
| 5,121,699 A | * | 6/1992 | Frank .......................... | 110/236 |
| 5,152,233 A | * | 10/1992 | Spisak ........................ | 110/236 |
| 5,170,726 A | * | 12/1992 | Brashears et al. .......... | 110/236 |
| 5,199,354 A | * | 4/1993 | Wood .......................... | 110/346 |
| 5,265,977 A | * | 11/1993 | Weirich et al. ............. | 405/128 |
| 5,275,507 A | * | 1/1994 | Hutter ........................ | 405/131 |
| 5,350,252 A | * | 9/1994 | Musil et al. ................ | 405/128 |
| 5,393,501 A | * | 2/1995 | Clawson et al. ............ | 110/236 |
| 5,455,005 A | * | 10/1995 | Clawson et al. ............ | 110/236 |
| 5,582,118 A | * | 12/1996 | Atkins et al. ............... | 110/346 |
| 5,596,935 A | * | 1/1997 | Swanson .................... | 110/346 |
| 5,613,452 A | * | 3/1997 | Marchesi et al. ........... | 110/346 |
| 5,619,936 A | * | 4/1997 | Veltmann ................... | 110/236 |
| 5,655,465 A | * | 8/1997 | Robertson .................. | 110/346 |
| 5,658,094 A | * | 8/1997 | Clawson ..................... | 405/131 |
| 6,110,430 A | * | 8/2000 | Swisher, Jr. et al. ....... | 110/236 |

* cited by examiner

Primary Examiner—Thomas B. Will
Assistant Examiner—Alexandra K Pechhold
(74) Attorney, Agent, or Firm—Schiff Hardin & Waite

(57) ABSTRACT

A soil decontamination apparatus includes a pug mill with twin, side-by-side augers or shafts with paddles moving the soil along a treatment path. A roof over the pug mill includes burners directing flames toward the soil as it is moved through the device. The burners are preferably staggered from one side of the roof to the other and are directed at an angle into the mixing chamber. Conveyors carry the soil into the decontamination apparatus and away from it, and a screening device separates rocks and the like from the soil prior to treatment.

17 Claims, 3 Drawing Sheets

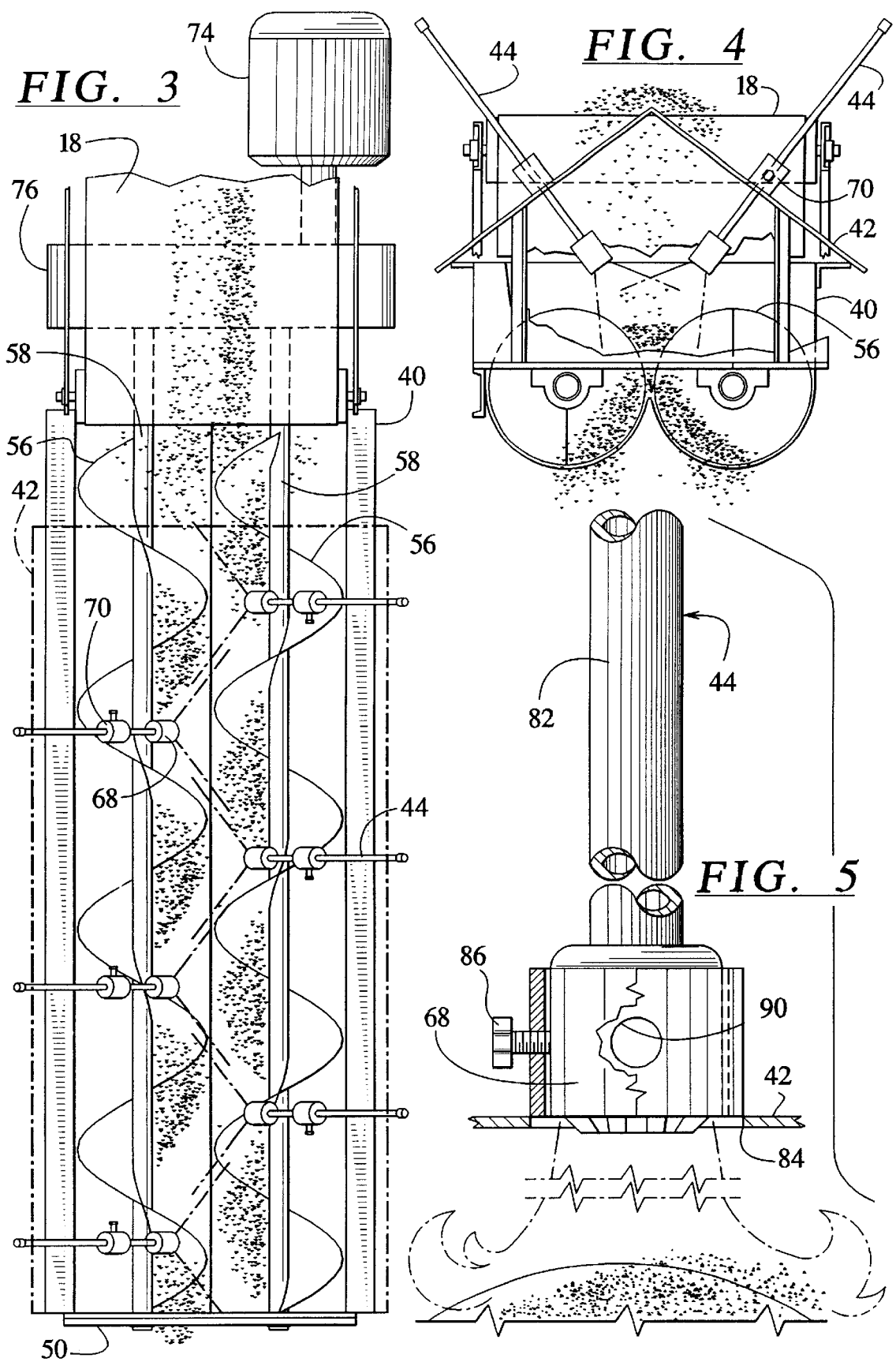

SOIL DECONTAMINATION APPARATUS AND METHOD

BACKGROUND OF THE INVENTION

1. Field of the Invention

The present invention relates generally to a method and apparatus for soil treatment, and in particular to a thermal soil treatment method and apparatus.

2. Description of the Related Art

Soil contamination presents problems more and more often as industrial and business facilities age, as environmental laws requiring clean-up are toughened, and as alternate use of contaminated areas is desired. Common sites requiring soil clean up are locations of former or existing gasoline stations where the underground storage tanks for the gasoline have leaked into the soil. State and federal environmental protection agencies have become involved in clean up efforts, often setting standards to be meet in the clean up operation.

A common approach to treating soil contamination requires large scale removal of the contaminated soil from a site, transport to a treatment facility or disposal site usually using trucks to haul the soil for substantial distances over the roads, treatment of the soil in large scale ovens at the treatment facility or disposal at a secure landfill, and return of the treated soil or transportation of other soil to the original site as fill for the excavation. The removal transportation and return transportation of the soil adds considerable expense to soil clean up projects. However, the stationary large scale ovens required heretofore for effective soil decontamination requires such transport.

SUMMARY OF THE INVENTION

An object of the present invention is to avoid transport of contaminated soil by providing soil decontamination on site.

Another object of the invention is to provide a portable soil decontamination unit.

A further object of the invention is to provide a device which can be retrofit onto existing equipment to provide soil decontamination.

These and other objects and advantages of the invention are provided by an apparatus for thermal soil treatment having a soil intake, a pug mill for transporting the soil through the device while turning and mixing the soil, and a plurality of burners directed toward the soil as it is moved through the device.

In a preferred embodiment, the pug mill is provided with a roof in which the burners are mounted. In one embodiment, the burners are in opposite sides of the roof alternately spaced from one another, i.e. staggered. The burners are directed toward the center wall of the pug mill so that the staggered burners provided coverage over a wide area of the soil surface as it moves through the pug mill. The burners cause contaminants in the soil to be burned away, or at least to change to a less hazardous form, so that the soil can be returned to the site.

Since the decontamination apparatus of the present invention is portable, it is preferred that the decontamination unit be moved to the site of the contaminated soil, that the soil be placed in the decontamination unit, and that the decontaminated soil be returned to the ground at the site, all without transporting the soil for any appreciable distance.

BRIEF DESCRIPTION OF THE DRAWINGS

FIG. 3 is a top plan view of the pug mill used in the present device showing the soil movement path;

FIG. 4 is an end view of the pug mill/burner unit; and

FIG. 5 is an enlarged view of a preferred burner as used in the present soil decontamination apparatus.

DETAILED DESCRIPTION OF THE PREFERRED EMBODIMENTS

Figure 1:
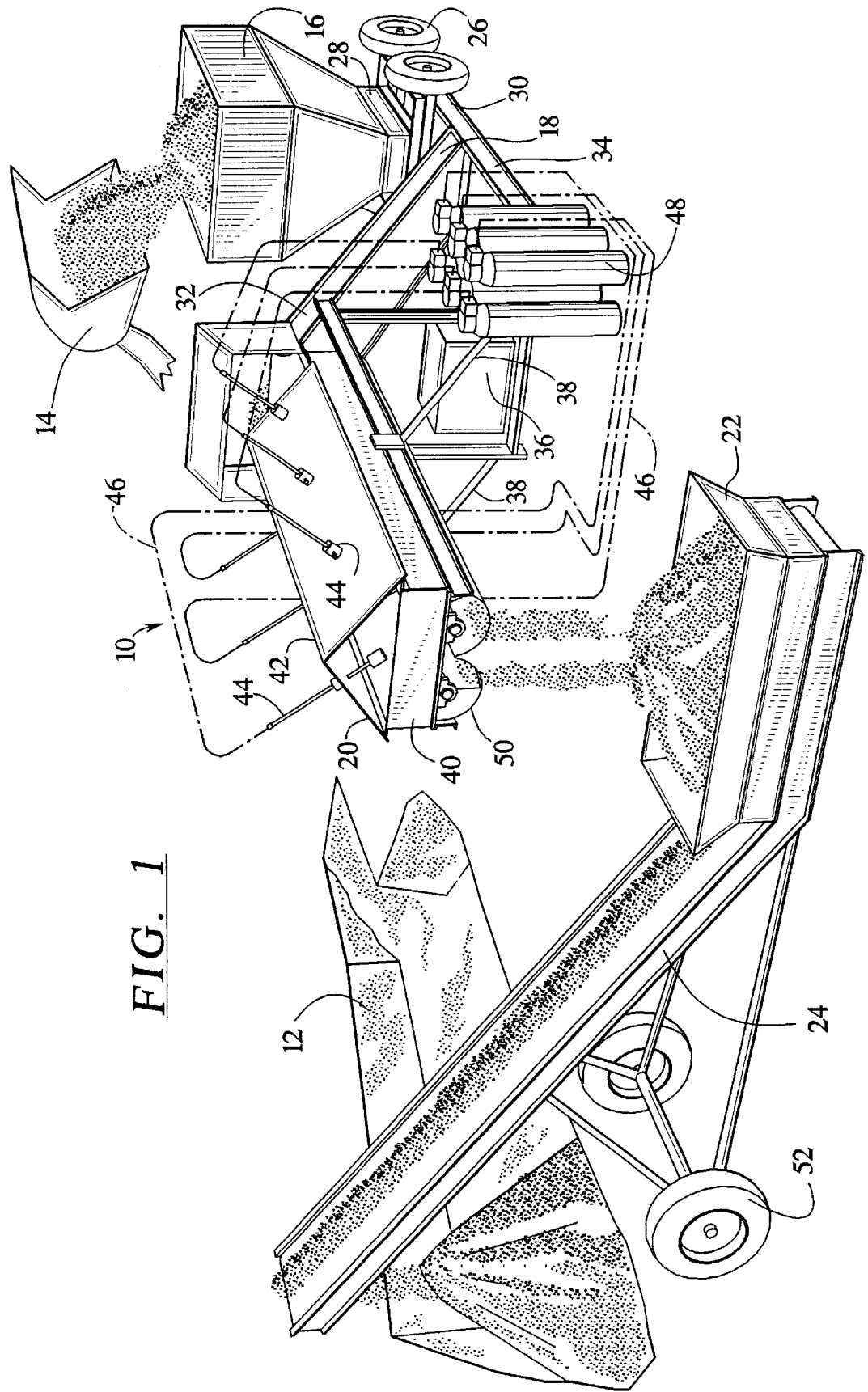
FIG. 1 is a perspective view of a soil decontamination arrangement in operation according to the principles of the present invention.

Referring first to FIG. 1, a soil decontamination apparatus 10 is shown. The soil decontamination apparatus 10 has been transported to a site of contaminated soil which must be treated. The soil is removed from a contamination site or excavation 12, such as by an excavator or back-hoe 14. The an excavator or back-hoe 14 places the contaminated soil into a power screening unit 16 to remove large rocks and the like from the soil. From the screening unit 16, the soil is dropped onto a conveyor 18, the conveyor 18 moving the soil to a soil in take of a soil decontamination apparatus 20. The decontamination apparatus 20 outputs the soil at an opposite end to a hopper 22 of a second conveyor 24, which moves the soil either to an intermediate storage location or returns the now decontaminated soil to the contamination site 12.

Off site transportation of the soil is avoided and transport of soil to the site for fill is reduced or eliminated, depending upon the character of the soil being treated.

In a preferred application of the present invention, the power screening unit 16 is a 4 inch screening unit, which removes rocks, cobbles, roots, etc. larger than 4 inches in diamneter. Other screening sizes may, of course, be used. The removed rocks are set aside for eventual return to the treatment site. The power screening unit 16 is on wheels 26 so that it can be moved to the treatment site and positioned as needed. The screened soil is output from the screening unit 16 at an output chute 28. The screening unit 16 may be dispensed with in treating soil that contains few or no rocks, roots, or other large debris, so that the soil is fed directly to the conveyor 18.

The conveyor 18 has a receiving end 30 positioned below the output chute 28 of the screening unit 16. From the receiving end 30, the soil is moved up the conveyor 18 to an output end 32. The conveyor 18 is supported by a frame 34 which rests on the ground and is driven by a drive unit 36. The speed of the conveyor 18 may be adjusted by controlling the drive unit 36 to vary the rate at which contaminated soil is fed to the soil decontamination apparatus 20. In one embodiment, speed control of the conveyor 18 is accomplished by the addition of a hydraulic valve in the hydraulic drive line of the drive unit 36.

The soil decontamination apparatus 20 is supported from the frame 34 in a cantilevered position by support arms 38 so that the area underneath is open for soil receiving hoppers, containers or vehicles, as needed. The soil decontamination apparatus 20 includes a twin shaft pug mill 40 over which is mounted a gabled roof 42 having burners 44 mounted therein. The burners 44 are fed fuel via fuel lines 46 that are connected to fuel tanks 48. As the soil passes along the pug mill 40 and is turned and aerated by the paddles of the pug mill, the burners 44 apply the flames of the burning fuel to the soil so burn away contaminants. The treated soil exits the pug mill 40 at an outlet end 50.

As the soil leaves the pug mill 40 at the outlet 50, it falls to the hopper 22. Instead of the hopper 22, it is possible for the treated soil to be received into a container, or into a bed of a truck, into some other transport or storage means, or let fall onto the ground. The hopper 22 holds the soil until it is moved by the conveyor 24 to the desired receiving location for the treated soil. As mentioned previously, the treated soil is shown being returned to the excavation 12 as clean fill. The conveyor 12 has wheels 52 so that it may be easily moved to direct the soil to the desired receiving location and so that is may be easily positioned beneath the outlet 50.

Thus, the soil is treated in situ by the present apparatus, at a far lower cost compared to transporting the soil off site for treatment.

Figure 2:
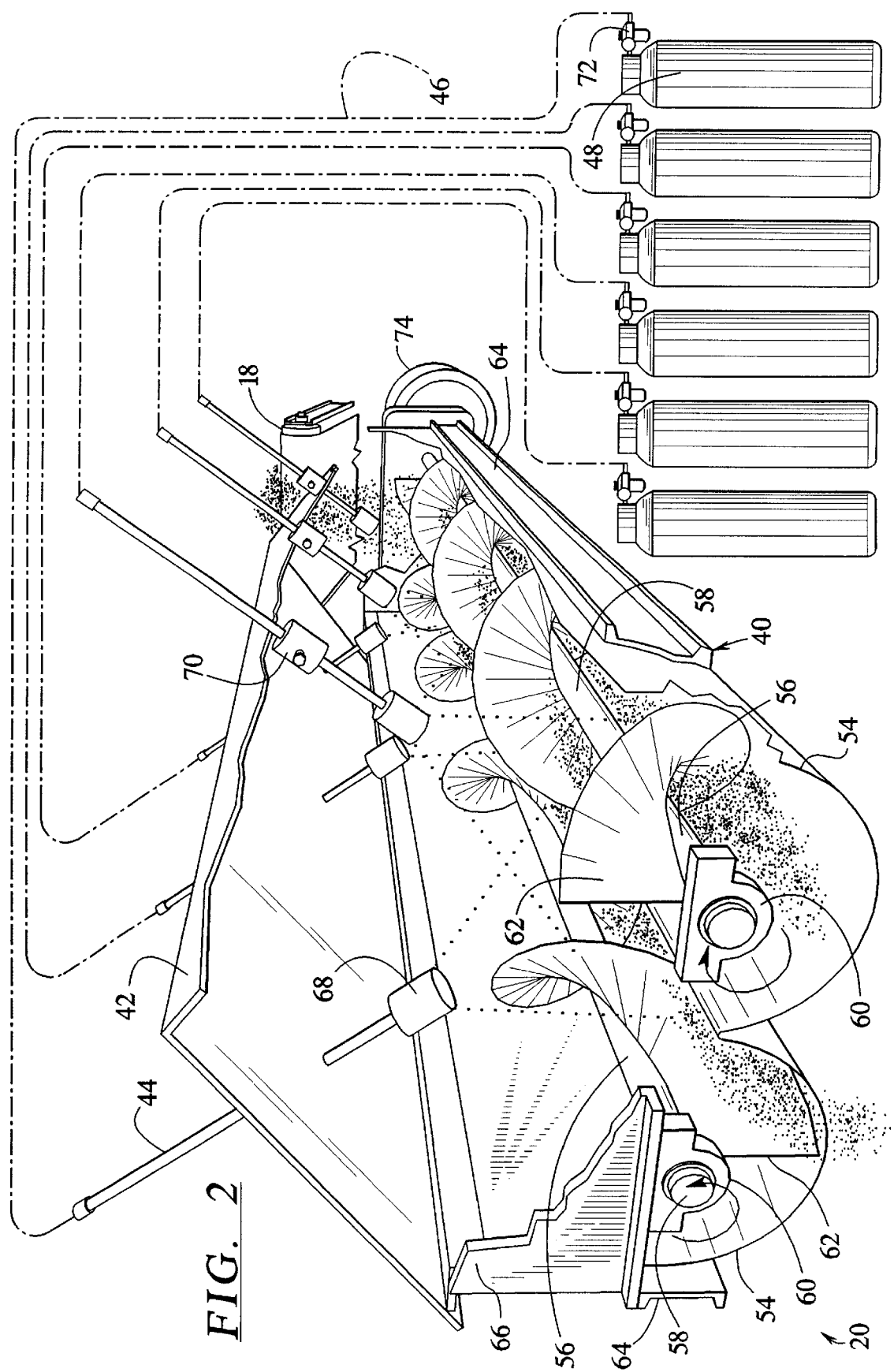
FIG. 2 is an end perspective view, partially broken away, of the pug mill/burner unit of the present invention.

Referring to FIG. 2, the soil decontamination apparatus 20 is shown in greater detail. The pug mill 40 has a housing 54 in a twin trough shape that mimics the lower profile of the paddles or augers 56. The augers 56 are each formed by an axle shaft 58 rotatably suspended in bearings 60 at opposite ends of the shaft 58. Extending radially outward from the shaft 58 are paddles or an auger blade 62. Depending on the type of pug mill 40 used in the present apparatus, the shaft 58 may have individual paddles mounted extending therefrom instead of the illustrated auger blade 62. Such paddles may be wide or narrow and fewer or greater in number, as desired. In one particular embodiment, the pug mill has two shafts each with 14 sets of paddles (each set having two paddles) for a total of 56 paddles in the pug mill. The paddles are rotated in opposite directions to move the soil toward the center of the pug mill 40 as it is carried therethrough.

The trough shaped housing 54 is held by a support beams 64 above which is a barrier wall 66 that prevents the soil from being spilled from the pug mill 40. Atop the barrier wall 66 is the gable roof 42 in which the burners 44 are mounted. The gable roof 42 is set onto the barrier wall 66 and may be attached thereto. One such attachment is that the roof is bolted on, or it may be chained on, or it may simply be set in place on the barrier wall, so as to permit quick removal. In one embodiment, the gable roof 42 is of plate steel. The roof not only supports the burners 44 but also holds in the heat generated by the burners to more effectively burn the contaminants from the soil.

The burners 44 each include a burner head 68 within the enclosure defined by the roof 42 and a support collar 70 at the outside roof surface by which the burner is supported. In the illustrated embodiment, three burners 44 are provided on each panel of the gabled roof 42, for a total of six burners in the apparatus. Of course, other numbers of burners may be used as well. The fuel is fed to the burners 44 through the fuel pipes 46, shown here by dot-dashed lines for the sake of simplicity. Each fuel pipe 46 is connected to a fuel tank 48 which also each include a regulator 72 for control of the fuel to the burners 44. The fuel of choice is propane, although the use of other fuels is also contemplated. Six separate fuel tanks 48 are shown, but fewer could be provided, with branching connections or distribution valves disbursing the fuel from the tank or tanks to the burners.

At the rear of the FIG. 3 is visible the upper end of the conveyor 18 which is feeding soil into the pug mill 40. The soil falls from the end of the conveyor 18 into the receiving end or input end of the soil decontamination unit 40. Also visible in this view is a pug mill motor 74 that drives the augers.

Additional detail is visible in the plan view of FIG. 3, including the pug mill motor 74 connected at an input of a transmission 76. The transmission 76 has two output shafts which are the auger shafts 58, which are driven in opposite directions. The transmission may be a chain drive, belt drive or gear drive transmission unit, and may incorporate a speed reduction as well.

The roof 42 is clear of the receiving end of the pug mill 40 to permit the soil from the conveyor 18 to fall into the pug mill 40 without interference. The rotation of the paddles 56 toward on another mixes, stirs, and aerates the soil as it is moved toward the center of the pug mill 40 and along the length thereof toward the output end 50. The paddles 56 aerate the soil as the burners 44 heat it so that contaminants are burned away. The burners 44 are staggered in their mounting in the roof 42, thereby providing coverage of the soil by the burner flames all along the soil transport path of the pug mill 40. Efficiency of fuel use is realized.

With reference to FIG. 4, movement of the soil toward the center by the opposite rotation of the augers 56 is seen. The burners 44 are mounted so as to be directed toward the center and toward the opposite wall of the pug mill 40 from the respective burner. Thus, the staggered arrangement of the burners 44 directs the flames in a cross-fire direction to provide a cross-fire decontamination unit. The burners 44 are generally perpendicular to the portion of the gabled roof 42 in which they are mounted. The angle of the panels of the roof 42 determines, to some extent, the angle of the burners 44.

In FIG. 5 is an enlarged view of a preferred construction of a burner 44 and its mounting in the roof 42. In this embodiment, the burner head is held in a sleeve at the roof line, as opposed to the construction illustrated in FIGS. 1–4, where the head extends into the burn chamber. The construction of FIG. 5 is preferred. The burner 44 includes a burner head 80 which in a preferred embodiment is a rosebud type burner. Propane gas it fed into the burner head 80 to generate a broad flame that is directed angled downwardly toward the soil as it is moved through the pug mill 40. The illustrated burner head 68 is mounted on a tube 82 through which the propane is supplied. The end face of the head may extend slightly through an opening 84 in the roof 42 and the head itself is supported by the collar 70. The collar 70 has a set screw 86 that bears against the head 80 to hold it in an axial position. The set screw 86 may be loosened to permit axial adjustment of the head 80 relative to the roof 42. The tube 82 extending from the top of the burner 80 is outside the collar 70 and extends above the roof. This construction permits adjustment of the burner head between a position flush with the inside of the roof to a position extending two or three inches into the interior of the roof. As a further improvement, a one inch diameter hole 90 is drilled in the side of the collar on the side facing downward relative to the pitch of the roof. This hole permits air to enter the burn chamber near the burner head.

In one embodiment of the invention, each of the burner heads is capable of yielding 500,000 BTUs maximum. The roof 42 over the pug mill 40 is steel plate of $5/16$ inch thickness, in one embodiment, and the angle of the roof 42 is usually greater than 90 degrees between the two roof panels. The angle, however, depends on the auger configuration and the width of the pug mill.

The roof and burners may be added to an existing pug mill as an add-on, so that manufacturing costs for the present device are kept small. It is even possible that the thermal unit (the roof and burner arrangement) may be removable so that the pug mill could be used for its usual duties, for example, mixing cold patch for roads, when not treating contaminated soil.

In tests at a gasoline station site with soil gas concentrations in excess of 2500 ppm, soil treatment using the present arrangement resulted in contaminant concentrations of less than 500 ppm after treatment with only a single pass through the present apparatus. The hydraulic valve on the feed conveyor was adjusted to provide a treatment rate of 30 to 33 cubic yards of soil per hour. No visible emissions were seen during treatment. The soil at the site is a glacial till of a silty sand matrix embedded with gravel, cobbles and boulders. Comparisons of clean up costs for the site showed that the cost for removal of the soil, transportation to a soil treatment or soil disposal site and replacement soil was estimated at in excess of $127,000, while clean up costs using the present invention were less than $59,000. The present invention thus represents a considerable cost savings over the previous clean up methods. A substantial reduction in the cost is the elimination of transportation of the soil, which results from the portability of the present device.

The present invention finds particular utility in clean up of hydrocarbon contaminated soils, i.e. soils contaminated with oils and gasoline. Petrochemical contaminants are effectively removed by the present apparatus. The cleaned or remediated soil can be returned to the site. The portability and small size of the present apparatus, as well as its low cost of use means that it can be used to clean up smaller contamination sites which would have been cost prohibitive in the past. By eliminating the need to relocate the contaminated soil, land fill space is not required for soil disposal. Also, the risks of mishandling and spillage of the soil during transportation are eliminated.

While the present invention has been described for use in soil clean up, it is also contemplated that it be used in clean up of beaches for marine oil spills. Spill catch areas at refineries, whether of sand or gravel or granularized clay, may also cleaned with the present apparatus. The thermal treatment by the present apparatus makes it able to detoxify biological contaminants in the soil, as well.

Although other modifications and changes may be suggested by those skilled in the art, it is the intention of the inventors to embody within the patent warranted hereon all changes and modifications as reasonably and properly come within the scope of their contribution to the art.

I claim:

1. A soil decontamination apparatus, consisting essentially of:
    a portable add-on treatment top;
    at least one burner including a burner head with a burner opening adjustably mounted in said portable add-on treatment top so as to permit varying a distance of said burner opening relative so said treatment top;
    a portable mill housing having at least one shaft with mixing paddles,
    said portable add-on treatment top being selectively positioned on site upon the portable mill housing as to form at least one of a soil remediation and decontamination device;
    said at least one of a soil remediation and decontamination device including:
        a soil intake for receiving contaminated soil;
        a soil treatment path, the at least one shaft with mixing paddles placed in said soil treatment path;
        a drive connected to said at least one shaft with mixing paddles to move soil along said soil treatment path;
        the at least one burner to direct flames toward the soil as the soil is moved along said soil treatment path so as to burn contaminants from the soil; and
        a soil outlet at an opposite end of said soil treatment path from said soil intake.

2. A soil decontamination apparatus as claimed in claim 1, wherein said portable add-on treatment top includes a roof over said soil treatment path, and said at least one burner being a plurality of burners mounted in said roof.

3. A soil decontamination apparatus as claimed in claim 1, wherein said soil treatment path and said mill housing with said at least one shaft with mixing paddles and said drive are a pug mill that is independently usable without said portable add-on treatment top positioned thereon.

4. A soil decontamination apparatus as claimed in claim 1, wherein said at least one shaft with mixing paddles is two shafts with mixing paddles arranged side-by-side in parallel to one another and driven in opposite directions.

5. A soil decontamination apparatus as claimed in claim 2, wherein said plurality of burners includes two rows of burners mounted staggered relative to one another in respective rows.

6. A soil decontamination apparatus as claimed in claim 5, wherein each of said plurality of burners includes a burner shaft on which said burner head is mounted, each of said plurality of burners extending through a corresponding opening in said portable add-on treatment top.

7. A soil decontamination apparatus as claimed in claim 2, wherein said burner heads are rosebud-type burner heads.

8. A soil decontamination apparatus as claimed in claim 1, wherein:
    said least one burner includes a shaft on which said burner head is mounted, said burner extending through an opening in said portable add-on treatment top; and
    the soil decontamination apparatus further comprises:
        a collar through which the burner head extends, said collar being affixed on said portable add-on treatment top; and
        a fastener selectively fastening said burner head in any of a plurality of positions.

9. A method for soil decontamination at a first soil decontamination site and at a second decontamination site, each of said first and second decontamination sites having thereat respective first and second pug mills, comprising the steps of:
    transporting a portable add-on treatment top with burners to the first soil decontamination site;
    mounting the portable add-on treatment top on the first pug mill at the first soil decontamination site;
    intaking contaminated soil to said first pug mill;
    moving the contaminated soil along a soil treatment path in said first pug mill;
    at least one of mixing and aerating the soil as it is moved along the soil treatment path by paddles of said first pug mill;
    applying thermal energy from said burners in said portable add-on treatment top to the soil as it is moving and said at least one of mixing and aerating, so as to burn away contaminants in the soil;
    outputting the soil from the first pug mill at an end of the soil treatment path;
    removing the portable add-on treatment top from said first pug mill;
    transporting said portable add-on treatment top from the first soil decontamination site to the second soil decontamination site;
    placing said portable add-on treatment top on said second pug mill at said second soil decontamination site
    intaidng contaminated soil to said second pug mill;
    moving the contaminated soil along a soil treatment path in said second pug mill;

at least one of mixing and aerating the soil as it is moved along the soil treatment path by paddles of said second pug mill;

applying thermal energy from said burners in said portable add-on treatment top to the soil as it is moving and said at least one of mixing and aerating, so as to burn away contaminants in the soil; and outputting the soil from the second pug mill at an end of the soil treatment path.

10. A method as claimed in claim 6, wherein said step of applying thermal energy is performed by a directing ones of the plurality of burners in a first direction and directing others of the plurality of burners in a second direction.

11. A method as claimed in claim 10, wherein said first and second directions are crossfire directions relative to one another.

12. A method as claimed in claim 9, wherein said step of intaking is performed immediately adjacent a site at which the contaminated soil is located.

13. A method as claimed in claim 9, further comprising the step of; screening the soil to remove rocks over a predetermined size prior to said step of moving the soil along the soil treatment path.

14. A method as claimed in claim 9, wherein said steps of moving and disturbing the soil is performed by side-by-side shafts with mixing paddles.

15. A method for converting a construction site with a mill housing in to a soil decontamination site, comprsing the steps of:

providing a portable add-on treatment top with at least one burner including a burner head with a burner opening adjustably mounted thereto so as to permit varying a distance of said burner opening relative to said portable add-on treatment top;

attaching on site the portable add-on treatment top to a portable mill housing as to form at least one of a soil remediation and decontamination device, the portable mill housing having at least one shaft with mixing paddles;

said at least one of a soil remediation and decontamination device including:

a soil intake for receiving contaminated soil;

a soil treatment path, the at least one shaft with mixing paddles placed in said soil treatment path;

a drive connected to said at least one shaft with mixing paddles to move soil alone said soil treatment path;

the at least one burner to direct flames toward the soil as the soil is moved alone said soil treatment path so as to burn contaminants from the soil; and a soil outlet at an opposite end of said soil treatment path from said soil intake.

16. A soil decontamination apparatus for converting a mill to a soil decontamination use, comprising:

a portable add-on treatment top in a shape of a roof for selective mounting over a mill;

a plurality of burners mounted in said portable add-on treatment top, each of said plurality of burners having a respective shaft on which a respective burner head is mounted and directly downwardly into a respective opening in the portable add-on treatment top; the respective burner head being selectively positionable at different distances from an underside of said portable add-on treatment top by sliding movement of an associated burner in said portable add-on treatment top; and a fastener for selectively securing the respective burner head in position at said different distances.

17. A soil decontamination apparatus as claimed in claim 16, wherein said fastener includes a collar around said burner head and a set screw in said collar.

* * * * *